Sept. 6, 1960    H. A. DORMAN ET AL    2,951,661
AIRCRAFT HAVING A PLURALITY OF ANNULAR WINGS
Filed Dec. 30, 1957    2 Sheets-Sheet 2

INVENTORS
HARLEY A. DORMAN
& BRUCE A. DORMAN
BY
ATTORNEYS

United States Patent Office 2,951,661
Patented Sept. 6, 1960

2,951,661
AIRCRAFT HAVING A PLURALITY OF ANNULAR WINGS

Harley A. Dorman, 2969 Montclair Ave., Detroit 14, Mich., and Bruce A. Dorman, P.O. Box 312, Hondo, Tex.

Filed Dec. 30, 1957, Ser. No. 705,947

8 Claims. (Cl. 244—23)

Our invention relates generally to an improved aircraft of the heavier than air type and, more particularly, to an aircraft capable of a high degree of maneuverability and characterized by a relatively small size. We contemplate that the improved aircraft of our instant invention may be used for transporting passengers to and from congested urban areas with a minimum of difficulty.

According to a principal feature of our invention, we have provided a plurality of annular wings situated in adjacent tangential relationship, an air propulsion means being disposed within each annular wing to accelerate the ambient air therethrough to provide a useful thrust. Although three or more annular wings may be employed in this fashion, we prefer to use four wings as will be hereinafter described.

According to another feature of our invention, we have provided an air guiding shroud on the upstream side of the annular wings and have strategically located the same over the central region of the annular wing assembly so that all of the air enveloped by the streamlines passing through the projected frontal area of the aircraft will pass through the annular wings. Any particle of the displaced air which is not located on a streamline passing through the projected geometric frontal area of one of the annular wings in the assembly is deflected or guided by the shroud into an appropriate annular wing and is utilized by the air propulsion means to obtain a useful thrust. It is thus apparent that all of the air displaced by the assembly is used to obtain a useful thrust and the overall operating efficiency is at an optimum value regardless of the percent of maximum power supplied by the air propulsion means and regardless of the air speed.

The provision of an improved aircraft of the type above set forth being a principal object of our invention, it is a further object of our invention to provide an aircraft having multiple annular wings as above set forth, and wherein a pilot's compartment is formed as part of the wing assembly thus eliminating the parasitic drag induced by the passenger carrying body portion of more conventional aircraft. This is accomplished in the structure of our instant invention by locating the pilot's compartment within the inner region of the annular wing assembly thus removing the same from the active air stream.

It is a further object of our invention to provide an aircraft as above set forth wherein control surfaces are situated on the upstream side of the annular wing assembly in an undisturbed, non-energized part of the streamtube defined by the air streamlines.

Other objects and advantages of our instant invention will readily become apparent from the following description and from the accompanying drawings wherein.

Figure 1:
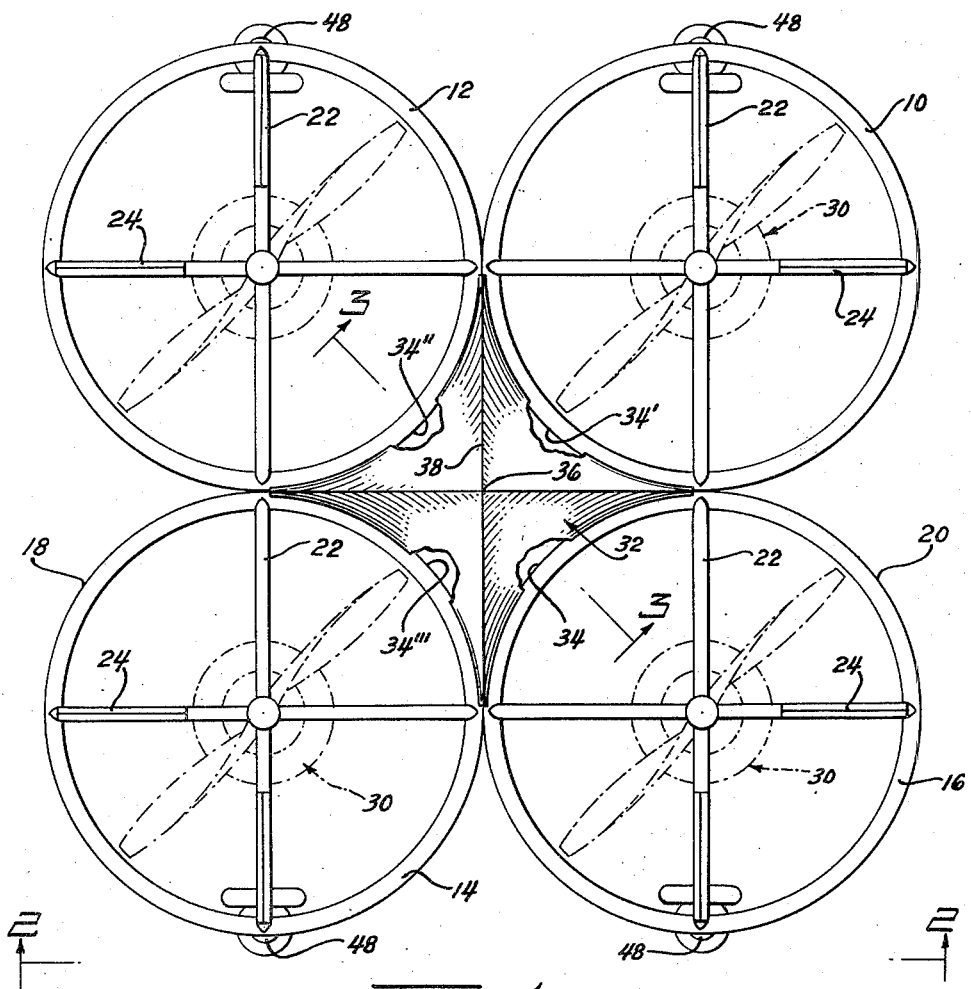
Fig. 1 is a plan view of one embodiment of our instant invention employing four annular wings situated in tangential and adjacent relationship.
Figure 2:
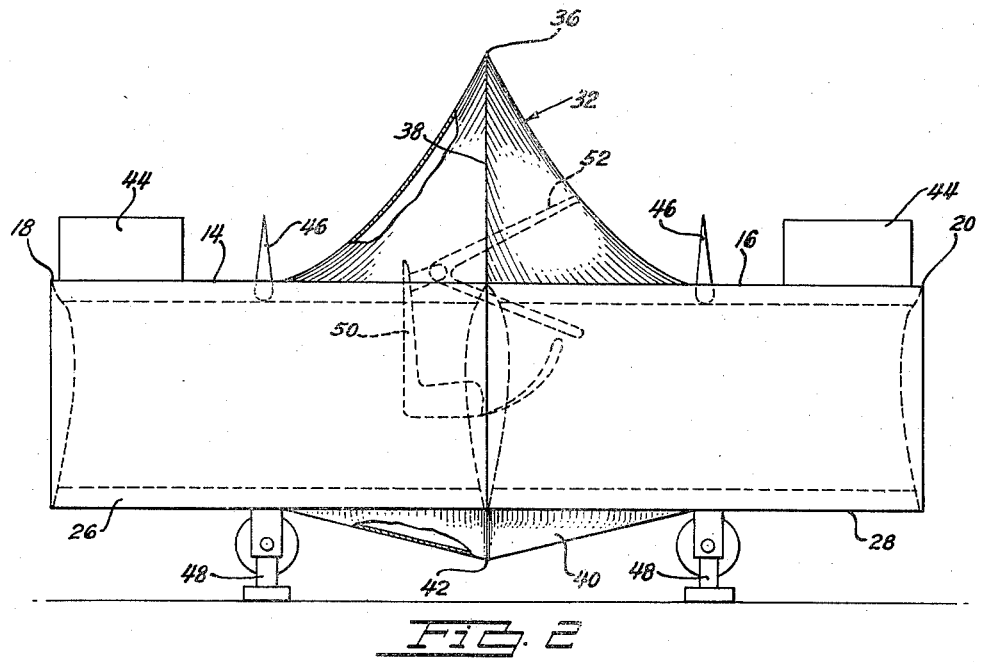
Fig. 2 is a side elevation view of the assembly of Fig. 1 as viewed along reference line 2—2 of Fig. 1.

Referring first to Figs. 1 and 2, the annular wings are designated by reference characters 10, 12, 14 and 16, respectively. Each of the annular wings has an axial length at least as great as its radius, and they are of cambered, streamlined cross section. As best seen in Fig. 2, each of the annular wings is provided with a single cambered construction with the camber extending radially inward. The skin of the outward surface of each of the annular wings lies in a geometric cylindrical plane, and the leading edge of each of the annular wings is formed with a sharp knife-like extension, as best seen in Fig. 2, at 18 and 20. The cambered construction of the annular wings provides an inner venturi section to reduce aerodynamic resistance and to increase the structural rigidity of the wing. However, since each of the annular wings is formed with the knife-like projections on their respective leading edges, the venturi sections originate at a station located rearwardly from the leading edge. By preference, structural ribs and sheet metal skin may be provided in constructing the annular wings, but since the use of such structural members is well known in this art, we will not describe the same in further detail. The knife-like leading edges of the annular wings makes it possible to shear the air thus causing a minimum of disturbance in the surrounding regions.

Each of the annular wings is formed with radially extending struts adjacent the leading edge, as well as at the trailing edge. The leading edge struts of the annular wing 10 are shown in Fig. 1 at 22 and 24 and, by preference, they may be formed with an aerodynamic cross section to reduce the aerodynamic resistance encountered during operation. Similar struts are provided on each of the other annular wings and they are designated by corresponding numerals. The struts located adjacent the trailing edge of each of the annular wings are illustrated in Fig. 2 by means of dotted lines, and two of these struts are designated by numerals 26 and 28. By preference, the rearwardly disposed struts are equal in number to the number of struts situated at the leading edge of the annular wings.

An engine and propeller assembly is situated within each of the annular wings and is journaled by means of the struts located at each axial end of the annular wings. Suitable mounting means are provided at the geometric center of each of the annular wings at the juncture of the associated radial struts. The propeller and engine assemblies may best be seen in Fig. 1, and they are generally designated by reference character 30.

Each of the annular wings are structurally joined to form an integral assembly, the juncture between the individual wings being located at the point of tangency. It is thus apparent from an inspection of Fig. 1 that the region defined by the inner portions of the four annular wings is a regularly shaped compartment having an axial length equal to the length of the annular wings, said compartment being adapted to accommodate a pilot. It is possible to provide an inner wall within the pilot compartment thereby defining an inner compartment portion and an auxiliary portion between the inner wall and the surrounding annular wings. However, in the embodiment herein described, the pilot compartment is defined by the structural skin on the outer cylindrical surface of the annular wings.

Figure 3:
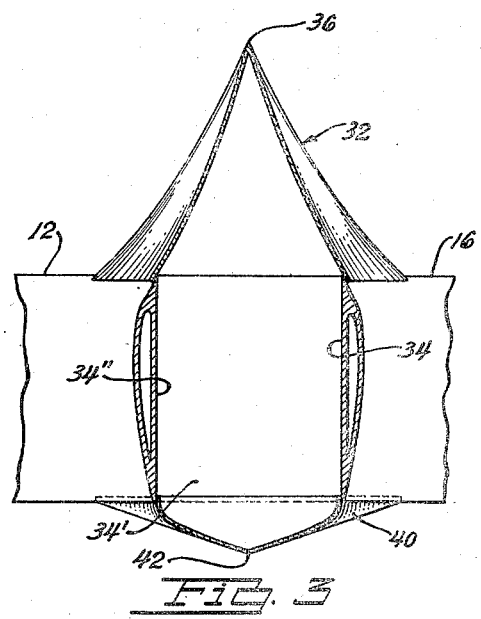
Fig. 3 is a partial cross sectional view of the assembly of Fig. 1, and is taken along the section line 3—3 of Fig. 1.

The cross sectional view of Fig. 3 more clearly illustrates the utilization of the inner region of the assembly to define a compartment capable of housing the pilot and the various instruments and controls necessary to pilot the aircraft, the inner walls of the compartment being shown in Figs. 1 and 3 at 34, 34′, 34″ and 34‴.

A canopy or shroud is situated on the leading edge side of the annular wing assembly over the pilot's compartment, and it is generally designated by numeral 32. The base of the canopy or shroud 32 is secured to and conforms in shape with the leading edge of the adjacent annular wings. The apex of the shroud 32 is located a substantial distance ahead of the leading edge of the annular wings and is situated on the geometric center of the annular wing assembly. It is thus apparent that the shroud 32 defines a four sided regularly shaped geometric body in which the sides are generally concave and extend from the circular base to the apex on the geometric center of the assembly, said apex being designated by numeral 36. The shroud 32 may be formed in whole or in part of a transparent plastic material of a conventional type to permit adequate visibility during flight; and the intersection of the various concave sides of the shroud form ribs which tend to rigidify the same, said ribs being designated by numeral 38 in Fig. 1.

The trailing edge side of the pilot's compartment is enclosed by a closure member or tail piece having a convex contour, the base of the closure member conforming in shape to the circular trailing edges of the annular wings. The base is designated in Fig. 2 by numeral 40. The convex sides of the closure member extend from the circular trailing edge of the annular wings to an apex designated in Figs. 2 and 3 by numeral 42.

Each of the struts 24 located on the leading edge side of the annular wing assembly has mounted thereon a control surface 44 which may be controlled by conventional motion transmitting means extending into the pilot's compartment. Similarly, each of the struts 22 has mounted thereon a control surface 46 which may similarly be controlled from the pilot's compartment in conjunction with the control surfaces 44. By preference, the control surfaces 44 and 46 are situated at right angles with respect to each other, thereby providing both longitudinal and lateral stability. Similarly, the control surfaces 44 and 46 may be employed to counteract any unbalanced turning couple resulting from variations in the relative magnitudes of the torque made available by each of the four engines. Two of the engines may be rotated in a different direction thereby providing torque couples which tend to cancel each other. However, any variation in the relative magnitudes of these torque couples may be compensated for by the control surfaces 44 and 46.

As best seen in Fig. 2, suitable landing gear 48 may be secured to the rearwardly mounted strut members of the annular wing and, by preference, they consist of telescopically related members cushioned by either mechanical or fluid type spring means.

As best seen in Fig. 2, a pilot's chair 50 is situated within the pilot's compartment and pivotally mounted on a structural bracket 52, so that it is free to pivot universally, thereby maintaining the pilot in an upward position throughout a variation of flight angles.

During operation, the aircraft is adapted for vertical take off with all of the engine and propeller assemblies operating simultaneously. The control surfaces 44 and 46 are located in an undisturbed portion of the active air stream, and a higher degree of maneuverability and stability is obtained for this reason. The engine and propeller assemblies accelerate the ambient air, thereby creating a useful thrust and the magnitude of this thrust is equal to the time rate of air mass displacement. All of the air located within the boundaries established by the outer surfaces of the annular wing is utilized by the air propulsion means, and all of the air so displaced contributes to the useful thrust used for flight purposes. The shroud 32 is effective to guide the ambient air into the surrounding annular wings in an efficient manner. The rearwardly mounted closure member for the pilot's compartment similarly guides the air after it passes through the annular wings so that a minimum of aerodynamic resistance is obtained through the eddies established by low pressure regions. It is thus apparent that the air displaced by the air propulsion means defines a continuous aerodynamic streamtube and the direction of the median streamline of this streamtube may be controlled so as to produce the desired control force components to obtain stability and directional control. Since the air is thus utilized to an optimum degree, the physical dimensions of the aircraft may be reduced proportionately for any desired load lifting capacity. The force components obtained for stability and control purposes are independent of air speed, thus greatly enlarging the operating speed range.

It is apparent from the foregoing that the vertical thrust component obtained in this fashion may be resolved in part into a horizontal force component for horizontal flight purposes merely by adjusting the posture of the aircraft so that its geometric central axis deviates from the vertical. The appropriate deviation may readily be obtained by means of the control surfaces.

The instant invention represents a distinct improvement over the aircraft disclosed and claimed in our co-pending application, Serial No. 502,426, filed April 19, 1955, but the principles employed in the invention disclosed in our previous application may also be applied to our instant invention. For example, it is desirable to provide the annular wings with a length to diameter ratio which is greater than .5, and the location of the point of maximum camber of the various shrouds should be between 25 percent and 30 percent of the chordal length. Also the degree of camber in the annular shrouds should be sufficient to produce a relatively large cross sectional moment of inertia to provide needed structural rigidity.

What we claim and desire to secure by U.S. Letters Patent is:

1. An aircraft comprising a plurality of annular wings, each wing being circular in shape, the outer periphery of each annular wing being tangentially disposed relative to each of two other annular wings, said wings defining therebetween a passenger compartment, an air directing nosepiece located on the upstream side of said annular wings and covering said passenger compartment, the extremity of said nosepiece at the downstream side thereof being secured to and conforming in shape to the leading edges of said annular wings, the extremity of said nosepiece on the upstream side thereof being located at the axis of symmetry of said plurality of annular wings, the surface of said nosepiece being continuous from one of said extremities to the other, and air propulsion means located in each annular wing and adapted to displace air through said annular wings in an axial direction, said nosepiece being adapted to direct air into said annular wings during operation of said air propulsion means.

2. An aircraft comprising a plurality of annular wings, each annular wing being circular in shape, the outer periphery of each annular wing being tangentially disposed relative to each of two other annular wings, said wings defining therebetween a passenger compartment, an air directing nosepiece located on the upstream side of said annular wings, said nosepiece having an apex located on the upstream side thereof and a base secured to and conforming in shape to the leading edges of said annular wings, said apex being located at the axis of symmetry of said aircraft, said nosepiece having concave sides extending from said apex to the base thereof, the number of said concave sides being equal to the number of said wings, a tailpiece covering the downstream side of said passenger compartment, and air propulsion means located in each annular wing, said nosepiece being adapted to direct air into said annular wings during operation of said propulsion means whereby all of the moving air mass bounded by the stream tube defined by the moving air mass passes through said annular wing with a minimum of disturbance of the ambient air.

3. An aircraft comprising a plurality of annular wings, each annular wing being circular in shape, the outer periphery of each annular wing being tangentially disposed relative to each of two other annular wings, said wings defining therebetween a passenger compartment, an air directing nosepiece located on the upstream side of said annular wings, said nosepiece having an apex located on the upstream side thereof and a base secured to and conforming in shape to the leading edges of said annular wings, said apex being located at the axis of symmetry of said aircraft, said nosepiece having concave sides extending from said apex to the base thereof, the number of said concave sides being equal to the number of said wings, a tailpiece covering the downstream side of said passenger compartment, and air propulsion means located in each annular wing, said nosepiece being adapted to direct air into said annular wings during operation of said propulsion means whereby all of the moving air mass bounded by the stream tube defined by the moving air mass passes through said annular wing with a minimum of disturbance of the ambient air, the inner surface of each annular wing being cambered radially inward and the outer surface thereof being cylindrical.

4. An aircraft comprising a plurality of annular wings, each wing being circular in shape, the outer periphery of each annular wing being tangentially disposed relative to each of two other annular wings, said wings defining therebetween a passenger compartment, an air directing nosepiece located on the upstream side of said annular wings and covering said passenger compartment, the extremity of said nosepiece at the downstream side thereof being secured to and conforming in shape to the leading edges of said annular wings, the extremity of said nosepiece on the upstream side thereof being located at the axis of symmetry of said plurality of annular wings, the surface of said nosepiece being continuous from one of said extremities to the other, and air propulsion means located in each annular wing and adapted to displace air through said annular wings in an axial direction, said nosepiece being adapted to direct air into said annular wings during operation of said air propulsion means, the leading edge of each of said wings being of substantially zero camber for a portion of the total chordal length thereof, the inner surface of each annular wing being cambered radially inward and the outer surface thereof being cylindrical.

5. The combination as set forth in claim 4 wherein said annular wings are four in number and wherein each wing includes transverse struts, said struts forming a support for said air propulsion means, and control surfaces mounted on said struts.

6. The combination as set forth in claim 5 wherein said control surfaces extend forwardly of the plane of the leading edge of the annular wings.

7. The combination as set forth in claim 6 wherein said control surfaces are situated in substantially perpendicular planes thereby providing both longitudinal and lateral stability.

8. The combination as set forth in claim 7 wherein said air propulsion means comprises an engine powered propeller situated in each annular wing near the point of maximum camber thereof, the length of said wings being at least as great as the radius of said propeller.

References Cited in the file of this patent

UNITED STATES PATENTS

| | | |
|---|---|---|
| 1,791,597 | Langdon | Feb. 10, 1931 |

FOREIGN PATENTS

| | | |
|---|---|---|
| 763,758 | France | Feb. 19, 1934 |
| 893,866 | France | Feb. 28, 1944 |